No. 817,424. PATENTED APR. 10, 1906.
J. GREECE.
HORSE DETACHER.
APPLICATION FILED JUNE 29, 1905.

Inventor
James Greece.

Witnesses
Philip W. H. Ferrell.
J. Mae Wright

By David P. Moore,
Attorney

UNITED STATES PATENT OFFICE.

JAMES GREECE, OF UNIONTOWN, PENNSYLVANIA.

HORSE-DETACHER.

No. 817,424.　　　Specification of Letters Patent.　　　Patented April 10, 1906.

Application filed June 29, 1905. Serial No. 267,569.

*To all whom it may concern:*

Be it known that I, JAMES GREECE, a citizen of the United States, residing at Uniontown, in the county of Fayette and State of Pennsylvania, have invented certain new and useful Improvements in Vehicles, of which the following is a specification, reference being had therein to the accompanying drawings.

My present invention relates to improvements in vehicles, and has special reference to an improved mechanism by means of which harnessed animals may be quickly hitched to a shafted vehicle or in case of accident or runaway quickly unhitched, so as to prevent the animal from doing any damage to himself or vehicle.

To this end my invention consists of a new and novel construction of means whereby the traces are connected to the swingletree of a vehicle and whereby the breeching-straps are also connected, the said connection for the traces being operated in case of accident or runaway so as to disconnect the traces and allow the animal to escape from the shafts, the breeching-straps being disconnected as the animal moves forward and out of the shafts. To prevent the shafts from dropping to the ground as the animal is unhitched, I provide means to support the same. To attain these objects, my invention consists of a new and novel construction of apparatus, as herein set forth.

Figure 1:
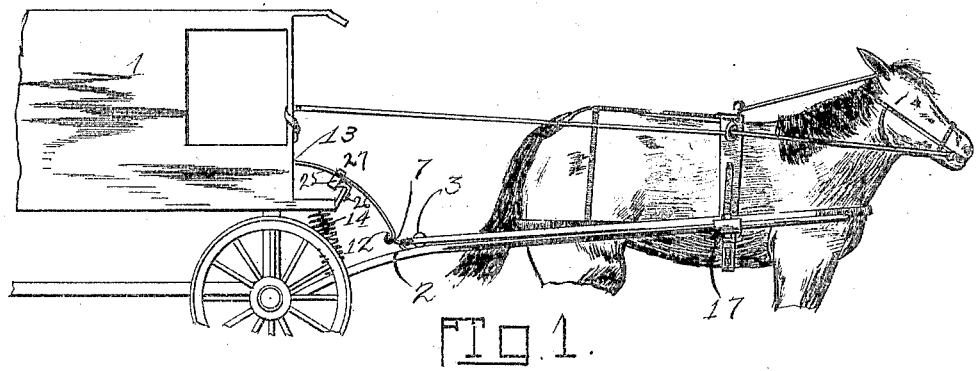
Figures 2, 4:
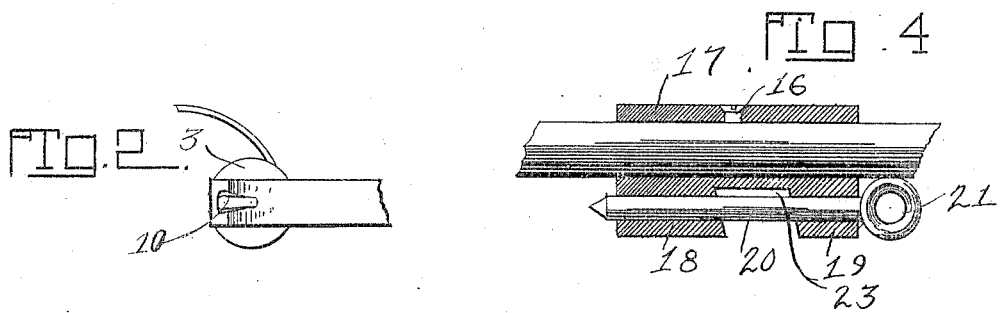
Figure 5:
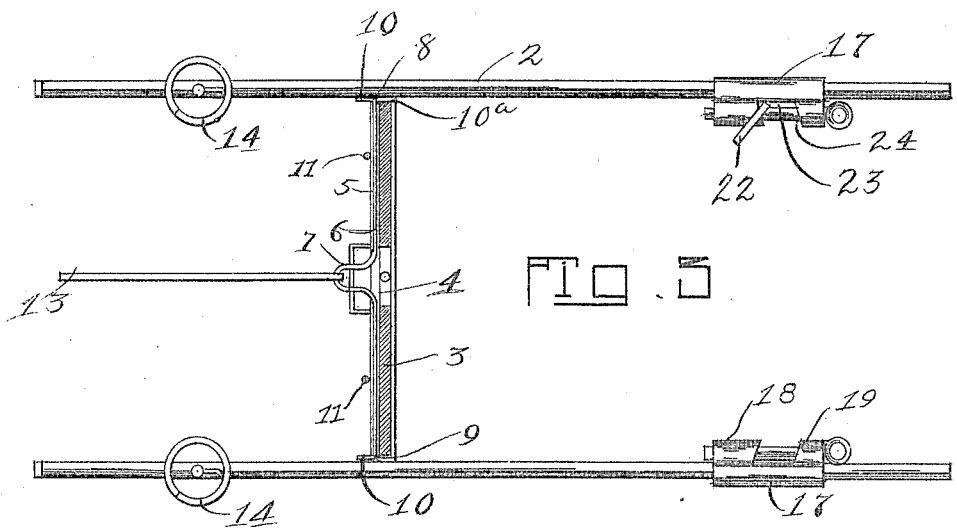

In the accompanying drawings, Figure 1 is a side elevation of a vehicle, showing my invention as applied in use. Fig. 2 is an enlarged detail view of the trace-hitching device shown in the position it assumes when releasing the trace. Fig. 3 is a top plan view of the complete shafts removed, showing my invention as applied thereto, the swingletree being in section; and Fig. 4 is an enlarged detail view of the breeching-securing device.

Referring to the drawings, the numeral 1 designates the vehicle, which has connected thereto in the usual manner the shafts 2, which are provided, as usual, with the swingletree 3. The swingletree is provided with the central cut-away portion 4 upon its upper face and with the longitudinal groove or slot 5 upon the rear face thereof. Rotatably mounted in this longitudinal groove or slot is a rock-shaft 6, provided with the centrally-arranged hooked bail 7 and upon the terminals 8 and 9 thereof with the trace-securing hooks 10. Any form of securing means may be employed to hold the rod within the groove, preferably staples 11. Connected to the centrally-arranged bail is the forward end of the operating-lever 12, which is adapted to extend rearwardly and have its handle 13 in close proximity to the driver, either passing through the dashboard or over the same.

Any number of levers may be employed and are conveniently located so as to rotate the rotatable rod 6, thus causing the hooks 10 to move in the proper direction to allow the traces to slide thereoff, the said hooks being so constructed as to cause the trace to move inward when the same is properly hitched or to move outward when it is desired to unhitch the animal from the shafts.

In order to prevent the shafts from falling as the traces are loosened and the animal removed from the shaft, I provide a pair of coiled springs 14, which are connected to the shafts and to the vehicle, as clearly shown in Fig. 1.

In order to properly secure the holdback-straps or breeching to the shafts, so as to operate properly in going downhill, but will be readily released when the animal is allowed to pass from the shafts, I secure to the shafts, by means of the rivets 16, the sleeve 17, which is adapted to surround the shaft and is provided upon its inner face with the two sleeves 18 and 19, the bore thereof running parallel with the shaft. Slidably mounted within the bore of these sleeves is a securing-pin 20, whose eye 21 is toward the front of the shaft and is connected to a portion of the harness of the animal, while the link 22 is adapted to enter the recess 23 between the two sleeves and be held in said recess by means of the pin, as clearly shown in Fig. 3. It will thus be seen that as the traces are disconnected from the swingletree the animal moves forward and the pins are withdrawn from the sleeves and the link connected to the breeching is unfastened and the animal is entirely unhitched from the shafts. In order to prevent the link from catching to the front sleeve, the rear edge 24 is beveled or inclined, as clearly shown in Fig. 3.

In order to hold the lever properly in inoperative position within the vehicle, I secure a catch 25 upon any convenient part of the vehicle by means of the plate 26, the lever being adapted to pass through the slot or opening 27 and have its downwardly-projecting lug or latch 28 engage the catch, so as to be held in inoperative position.

If it should become necessary to unhitch the animal, it is simply necessary to push the lever forward, which in turn rotates the trace-securing means, thus disconnecting the traces and allowing the animal to walk or run out of the shafts, the breeching or holdback strap being disconnected as the animal moves forward.

This device is not only to be used in case of runaways or accidents, but also provides a practical and useful means whereby animals are quickly hitched or unhitched, as the pin and link for securing the holdback or breeching straps can be connected to the harness, and all that is necessary is to properly secure the pin and links in place and connect the traces to the trace-connecting means.

In rainy and cold weather this apparatus is very desirable, as the animal can be quickly hitched and unhitched without the necessity of the driver exposing himself unnecessarily to the weather.

What I claim as new, and desire to secure by Letters Patent, is—

1. In a vehicle, the combination with the shafts and a swingletree, the latter provided with a longitudinal slot and a cut-away portion, of a trace-carrying rock-shaft rotatably mounted in the slot and provided with a bail in alinement with the cut-away portion, a rod engaging the bail and controlled by the driver on the wagon, said rod being constructed and arranged for forward movement, only, in rocking the shaft to release the traces therefrom, and means for connecting the holdback-straps to the shafts and constructed and arranged to permit automatic disengagement from the shafts of the holdback-straps by forward movement of the animal upon disengagement of the traces from the swingletree.

2. In a vehicle, the combination with the shafts and a swingletree, the latter provided with a longitudinal slot and a cut-away portion, of a trace-carrying rock-shaft rotatably mounted in the slot and provided with a bail in alinement with the cut-away portion, a rod engaging the bail and controlled by the driver on the wagon, said rod being constructed and arranged for forward movement, only, in rocking the shaft to release the traces therefrom, a sleeve rigidly secured around each shaft, and removable means engaging each sleeve and adapted for removable engagement, also, with the holdback-straps.

3. In a vehicle, the combination with the shafts and a swingletree, the latter provided with a longitudinal slot and a cut-away portion, of a trace-carrying rock-shaft rotatably mounted in the slot and provided with a bail in alinement with the cut-away portion, a rod engaging the bail and controlled by the driver on the wagon, said rod being constructed and arranged for forward movement, only, in rocking the shaft to release the traces therefrom, a sleeve rigidly secured around each shaft, and a removable pin slidably mounted in the sleeve and with which the holdback-straps removably engage.

4. In a vehicle, the combination with the shafts and a swingletree, the latter provided with a longitudinal slot and a cut-away portion, of a trace-carrying rock-shaft rotatably mounted in the slot and provided with a bail in alinement with the cut-away portion, a rod engaging the bail and controlled by the driver on the wagon, said rod being constructed and arranged for forward movement, only, in rocking the shaft to release the traces therefrom, a sleeve rigidly secured around each shaft, a removable pin slidably mounted in the sleeve and with which the holdback-straps removably engage, and a connection between the pin and a portion of the harness of the horse other than the holdback-straps.

In testimony whereof I affix my signature in presence of two witnesses.

JAMES GREECE.

Witnesses:
ROBERT LAURIE,
HARRY THORNE.